July 1, 1969  S. W. BIES ET AL  3,452,927

MODULAR COUNTER

Filed Dec. 19, 1967

INVENTORS
SYLVESTER W. BIES
ALLAN R. AMES

BY Lindsey, Prutzman and Hayes

ATTORNEYS

United States Patent Office 3,452,927
Patented July 1, 1969

3,452,927
MODULAR COUNTER
Sylvester W. Bies, Bloomfield, and Allan R. Ames, Weatogue, Conn., assignors to Veeder Industries Inc., Hartford, Conn., a corporation of Connecticut
Filed Dec. 19, 1967, Ser. No. 691,833
Int. Cl. G06c 27/00
U.S. Cl. 235—117                                    8 Claims

ABSTRACT OF THE DISCLOSURE

A modular internal pinion counter having a frame with a base portion and an upright stanchion, a nonrotatable counter shaft having one end received within a bore in the stanchion for mounting the shaft in cantilever fashion, and a plurality of counter wheels rotatably mounted on the counter shaft. An input helical gear rotatably mounted on the counter shaft adjacent the stanchion is coupled to the lowest order counter wheel, and pinion supports are pivotally mounted on the counter shaft intermediate the counter wheels. Internal transfer pinions mounted on integral pins of the pinion supports provide for connecting adjacent lower and higher order counter wheels, and the intermediate supports have aligned axial projections externally of the counter wheels which are collectively fixed to the base portion of the frame through screw fasteners which permit the intermediate supports to be angularly adjusted for pivotally positioning the transfer pinions to accurately align the indicia on the counter wheels.

Summary of the invention

This invention relates to counters, and particularly to a new and improved modular counter design using a minimum number of standard parts which may be employed to construct counters with different numbers of counter wheels.

It is a principal object of the present invention to provide a new and improved modular counter for aircraft instrumentation which meets the usual strict aircraft requirements including precision assembly especially with respect to the alignment of indicia, durability, minimum weight, and ease of parts replacement.

It is another object of the present invention to provide a counter for aircraft instruments having a design which is adapted to provide instrument counters with different numbers of counter wheels using the same standard parts.

It is a further object of the present invention to provide a modular counter which meets the aforesaid and other stringent design, assembly and operating requirements and which incorporates novel means for locating and supporting the components of the counter.

It is another object of the present invention to provide a durable counter having a minimum number of standard parts and providing for convenient replacement of parts.

It is another object of the present invention to provide a modular counter adapted for adjustably aligning the counter wheel characters for improving counter readability.

It is another object of the present invention to provide a modular counter requiring minimum drive torque.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Description of preferred embodiment

Figure 1:
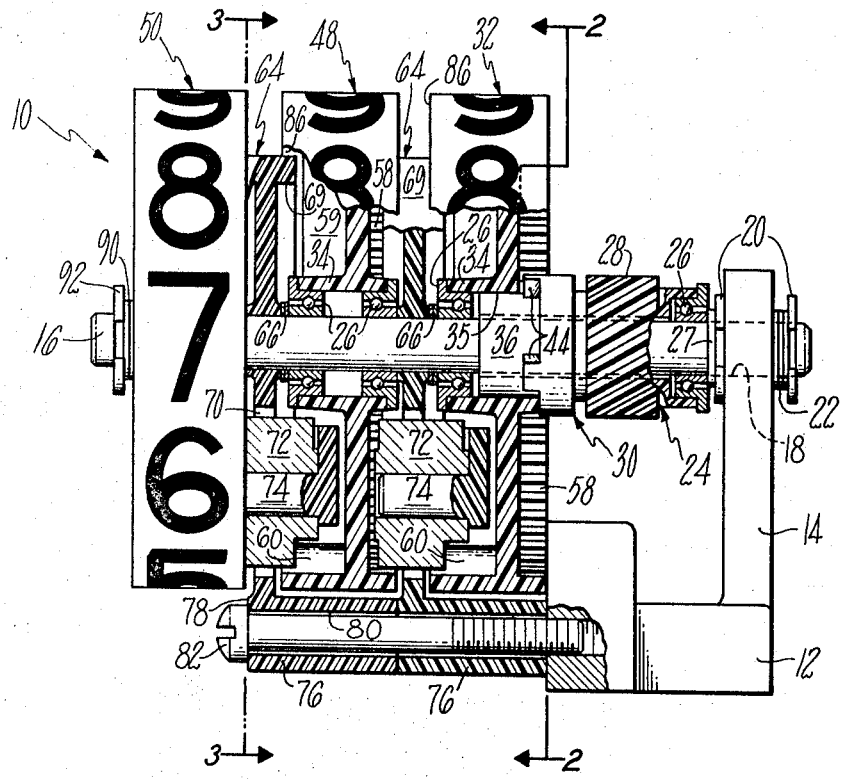
FIG. 1 is a side elevation view, partly broken away and partly in section, of a preferred embodiment of the modular counter of the present invention.
Figure 3:
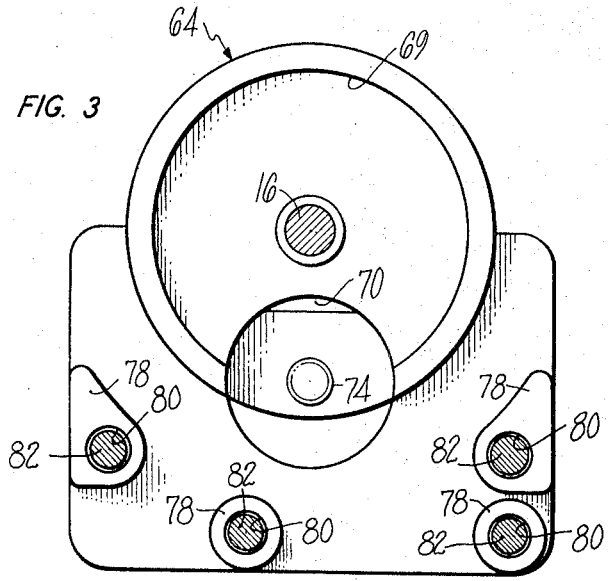
FIG. 3 is a transverse section view, partly in section and partly broken away, taken substantially along line 3—3 of FIG. 1.
Figure 2:
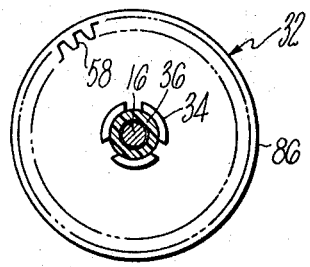
FIG. 2 is a reduced, transverse section view, partly in section, taken substantially along line 2—2 of FIG. 1.

Referring to the drawings in detail, a counter 10 incorporating the present invention is shown comprising a frame with a base 12 and an upright stanchion 14. A nonrotatable shaft 16 is inserted within a bore 18 of the stanchion 14 and is suitably retained against axial displacement within the bore 18 by C rings 20 received within peripheral grooves in the shaft 16 and intermediate washers 22. An integrally formed plastic drive sleeve 24 is rotatably supported on the shaft 16 in part by a ball bearing 26 received within an enlarged end bore of the sleeve 24. The ball bearing 26 has an inner race mounted on the counter shaft in engagement with a washer 27 on the shaft 16 and an outer race with a radial flange in engagement with the end of the sleeve 24. The drive sleeve 24 comprises an input helical gear 28 and a coupling 30 for connecting the sleeve for driving (and additionally for supporting in part) the lowest order counter wheel 32 of the counter.

The lowest order counter wheel 32, which is preferably of molded plastic construction, includes a hub 34 with a bore 35 for snugly receiving an end sleeve 36 of the coupling 30 and a ball bearing 26 having its radial flange engaging the outer end of the hub 34. The inner end of the hub 34 has three equiangularly spaced radial notches for receiving three teeth 44 of the drive sleeve 24 for coupling the drive sleeve to the lowest order counter wheel. Also, the assembled drive sleeve 24 and counter wheel 32 are together supported with the axially spaced bearings 26.

Counter wheels 48, 50 higher in order than the counter wheel 32, are for simplicity preferably constructed identically to the lowest order wheel 32 except that the higher order wheels 48, 50 have ball bearings 26 mounted within both ends of the wheel hub 34 for supporting the wheels. The counter wheels 32, 48 and 50 further include integrally formed internal wheel drive gears 58, transfer pinion locking rings 59, and transfer gear segments 60 which cooperate with transfer pinions 72 to generate transfers between adjacent lower and higher order wheels and to lock the pinions between transfers.

Plastic pinion supports 64 positioned intermediate the counter wheels have central bores receiving the shaft 16 for accurately positioning the supports with respect to the counter wheels and have opposed bosses surrounding the central bores which are engageable with the inner races of the bearings 26 or intermediate spacer washers 66 provided for controlling the end play of the counter wheels. The pinion supports 64, therefore, space the wheels from each other in a manner which precludes frictional contact between rotating and nonrotating components of the counter to reduce the drive torque for operating the counter.

Each support 64 has an aperture 70 for receiving a plastic transfer pinion 72 which is rotatably supported within the aperture by an axially projecting pin 74 integrally formed with an axially offset strut or bridge portion of the support 64 for engagement with the drive gear 58, transfer segment 60 and locking ring 59 of the adjacent counter wheels. The axes of the pins 74 are accurately located with respect to the axis of the shaft 16 by the accurate mounting of the support 64 on the shaft 16 such that the pinions 72 cooperate to generate transfers between adjacent lower and higher order wheels with minimum gear friction.

The supports 64 have axially extending projections or base portions 76 externally of and overlying the adjacent lower order number wheels substantially diametrically opposite the indicia on the counter wheels providing the counter readout. The axially extending projections 76 have enlarged bores 80 aligned with threaded apertures in the base portion 12 of the frame and have an axial length (which includes outer bosses 78 surrounding the enlarged bores 80) equal to the axial spacing of the counter wheels such that the axial projection 76 of the first intermediate support 64 engages the outer edge of the base portion of the frame and the remaining intermediate supports 64 (of which only one is employed in the shown embodiment) engage the axial ends of the adjacent projections 76. The intermediate supports 64 are secured to the base portion 12 of the frame through cap screws 82 which bear against the bosses 78 of the outermost intermediate support and are threaded into the apertures of the base. With the screws 82 loosened the counter 10 remains assembled but the intermediate supports 64 are relatively movable to provide for pivotal adjustment of the transfer pinions 72 about the shaft 16 within the limits provided by the enlarged bores, so that precise angular alignment of the counter wheel characters may be effected. Tightening of the cap screws 82 then provides for locking the counter parts to hold the aligned set.

The intermediate supports 64 also include circular light shields 69 between the exposed peripheral faces of the wheel rims 86 to prevent light leaks between the rims.

Washer 90 and a C ring 92 received in a peripheral slot in the counter shaft 16 provide for axially retaining the highest order counter wheel 50 in place. Thus, it can be seen that one or more counter wheels or other parts may be rapidly replaced by removing the C ring 92, washers 90 and the cap screws 82. Moreover, the counter design is such that a counter can be constructed to provide the appropriate number of counter wheels with standard parts and using a counter shaft 16 corresponding to the number of counter wheels desired.

The counter design thus provides for facilitating assembly of the counter and adjustment of the counter wheels for aligning the wheel characters and for maintaining the components of the counter uniformly precisely located and supported with respect to just one axis, that of the nonrotatable shaft 16. The counter is durable, lightweight and reliable, is operable with minimum torque, and is quiet in operation.

As will be apparent to persons skilled in the art, various modifications and adaptations of the structure above-described will become readily apparent without departure from the spirit of the invention.

We claim:

1. A modular counter comprising a frame with a base portion and an upright portion having an opening therein, a nonrotatable counter shaft having one end received within the opening of the upright portion and projecting outwardly thereof in cantilever fashion, a plurality of counter wheels of ascending order rotatably mounted on the shaft, intermediate transfer pinion supports pivotally mounted on the shaft intermediate the counter wheels respectively having axially extending projections externally of the counter wheels in alignment with the base portion of the frame, transfer pinions rotatably mounted on the intermediate supports about axes extending parallel to the axis of the counter shaft for cooperating with adjacent lower and higher order counter wheels for generating transfers therebetween, and fastening means for securing the axially extending projections of the intermediate supports to the base portion of the frame within a limited range of pivotal adjustment of the supports permitting pivotal adjustment of the transfer pinions for angularly aligning the counter wheels.

2. A modular counter as claimed in claim 1 in which the fastening means comprises elongated threaded openings in the base portion of the frame extending parallel to the axis of the counter shaft, through-openings in the axial projections of the intermediate supports in alignment with the threaded openings and screw fasteners extending through said through-openings and threaded into said threaded openings, the said through-openings in the axial projections being enlarged relative to the screw fasteners to permit limited pivotal adjustment of the intermediate supports about the counter shaft.

3. A modular counter as claimed in claim 1 wherein the intermediate supports are substantially identical parts, and wherein the axial projections of the intermediate supports have an axial length substantially equal to the axial spacing of the counter wheels.

4. A modular counter as claimed in claim 3 wherein the intermediate supports are of molded plastic construction.

5. A counter as claimed in claim 1 in which each support plate includes an enlarged peripheral ring coaxial with and of lesser diameter than the adjacent counter wheels and providing a light shield therebetween.

6. A modular counter as claimed in claim 1 further comprising a drive sleeve rotatably mounted on the counter shaft adjacent the counter wheel of lowest order, the counter wheel of lowest order having a central hub receiving the counter shaft with radial slots in the axial end thereof adjacent the drive sleeve, and the drive sleeve having lugs received within the radial slots to couple the drive sleeve to the counter wheel of lowest order and thereby form therewith a wheel and drive sleeve subassembly.

7. A modular counter as claimed in claim 6 wherein the drive sleeve has an end sleeve portion snugly received within the hub of the counter wheel and wherein the counter further comprises a pair of bearings at the opposite axial ends of the wheel and drive sleeve subassembly for rotatably supporting the subassembly on the counter shaft.

8. A counter comprising a frame, a counter shaft mounted on the frame, a plurality of counter wheels of ascending order mounted on the counter shaft with adjacent wheels of higher and lower order having respectively a wheel drive gear and a combined transfer gear segment and locking ring, intermediate transfer pinion supports pivotally mounted on the shaft intermediate the adjacent counter wheels of higher and lower order respectively, transfer pinions rotatably mounted on the intermediate supports about axes parallel to the axis of the counter shaft and in engagement with the drive gear and the combined transfer gear segment and locking ring of the adjacent higher and lower order counter wheels for generating a transfer from the lower to the higher order counter wheel and for locking the transfer pinion against rotation between transfers, and means for attaching the intermediate supports to the frame, the improvement wherein the attaching means provides for pivotally adjusting the intermediate supports relative to the frame within a limited range of pivotal movement for pivotally adjusting the transfer pinions to angularly align the counter wheels.

References Cited

UNITED STATES PATENTS

| 1,692,489 | 11/1928 | Dinsmore | 235—117 |
| 3,002,687 | 10/1961 | Herr | 235—117 |
| 3,097,792 | 7/1963 | Harada | 235—117 |

OTHER REFERENCES

German Printed Application No. 1,001,840, January 1957.

RICHARD B. WILKINSON, *Primary Examiner.*
S. A. WAL, *Assistant Examiner.*

U.S. Cl. X.R.

235—139